(12) United States Patent
Terada

(10) Patent No.: US 9,877,001 B2
(45) Date of Patent: Jan. 23, 2018

(54) THREE-PLATE OPTICAL SYSTEM AND PROJECTOR

(71) Applicant: Konica Minolta, Inc., Tokyo (JP)

(72) Inventor: Masahiro Terada, Hyogo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/034,832

(22) PCT Filed: Sep. 17, 2014

(86) PCT No.: PCT/JP2014/074475
§ 371 (c)(1),
(2) Date: May 5, 2016

(87) PCT Pub. No.: WO2015/068471
PCT Pub. Date: May 14, 2015

(65) Prior Publication Data
US 2016/0277717 A1    Sep. 22, 2016

(30) Foreign Application Priority Data

Nov. 5, 2013  (JP) .................................. 2013-229232

(51) Int. Cl.
*G03B 21/62* (2014.01)
*H04N 9/31* (2006.01)
(Continued)

(52) U.S. Cl.
CPC ....... *H04N 9/3158* (2013.01); *G02B 26/0833* (2013.01); *G02B 27/141* (2013.01);
(Continued)

(58) Field of Classification Search
CPC .......................... H04N 5/7458; G02B 26/0841
(Continued)

(56) References Cited

U.S. PATENT DOCUMENTS 7,008,060 B2 * 3/2006 Yamamoto ........... H04N 5/7458
                                                      348/771
7,230,768 B2    6/2007 Pinho
(Continued)

FOREIGN PATENT DOCUMENTS

JP    H10-104763 A    4/1998
JP    2002-287248 A   10/2002
(Continued)

OTHER PUBLICATIONS

International Search Report issued in PCT/JP2014/074475 dated Dec. 22, 2014 (2 pages).
(Continued)

*Primary Examiner* — Steven H Whitesell Gordon
*Assistant Examiner* — Jerry Brooks
(74) *Attorney, Agent, or Firm* — Osha Liang LLP

(57) ABSTRACT

A three-plate image projecting optical system that has a compact and simple configuration and achieves enhanced luminance efficiency and reduction of light quantity loss on the dichroic coating, and a projector equipped with the optical system. The optical system includes a color separating/combining prism having a first/second dichroic coatings, and a first to third digital micromirror devices. A first plane including an illumination light axis and a projection light axis on an image display surface of the third digital micromirror device and a second plane including a surface normal of the first/second dichroic coatings and a surface normal of a center of the third digital micromirror device are relatively rotated with respect to each other from orthogonal states toward a direction in which an incident angle of the illumination light axis with respect to the first dichroic coating or the second dichroic coating is decreased.

16 Claims, 15 Drawing Sheets

(51) Int. Cl.
  *G03B 21/20* (2006.01)
  *G03B 33/12* (2006.01)
  *G03B 21/00* (2006.01)
  *G02B 26/08* (2006.01)
  *G02B 27/14* (2006.01)

(52) U.S. Cl.
  CPC ......... *G02B 27/145* (2013.01); *G02B 27/148* (2013.01); *G03B 21/005* (2013.01); *G03B 21/2066* (2013.01); *G03B 33/12* (2013.01); *H04N 9/3105* (2013.01); *H04N 9/315* (2013.01)

(58) Field of Classification Search
  USPC ........................................ 353/33, 81; 348/771
  See application file for complete search history.

(56) References Cited

U.S. PATENT DOCUMENTS

| | | |
|---|---|---|
| 2002/0141070 A1 | 10/2002 | Sawai |
| 2004/0080938 A1* | 4/2004 | Holman ................ F21S 8/08 362/231 |
| 2006/0044654 A1 | 3/2006 | Vandorpe et al. |

FOREIGN PATENT DOCUMENTS

| | | |
|---|---|---|
| JP | 2006-079080 A | 3/2006 |
| JP | 2007-025287 A | 2/2007 |
| JP | 2010-276663 A | 12/2010 |
| JP | 2011-090069 A | 5/2011 |

OTHER PUBLICATIONS

Written Opinion of the International Searching Authority issued in PCT/JP2014/074475 dated Dec. 22, 2014 (4 pages).

* cited by examiner

THREE-PLATE OPTICAL SYSTEM AND PROJECTOR

BACKGROUND

1. Field of the Invention

The present invention relates to a three-plate optical system and a projector, for example, a three-plate image projection optical system equipped with a reflective display element such as a digital micromirror device and with a color separating/combining prism, and a projector including the three-plate image projection optical system.

2. Description of Related Art

A digital micromirror device is known as a reflective display element mounted on a projector. The digital micromirror device includes an image display surface formed with a plurality of microscopic micromirrors. On the image display surface, the digital micromirror device controls tilt of each of mirror surfaces to modulate intensity of illumination light, thereby forming an image. An ON/OFF of each of pixels of the digital micromirror device is indicated, for example, by mirror surface pivoting of ±12° around a rotation axis forming an angle of 45° with respect to each of sides of the image display surface.

On a projector using a reflective display element such as a digital micromirror device and using a color separating/combining prism, an incident angle with respect to a dichroic coating inside the color separating/combining prism differs between illumination light and projection light (ON light). This leads to occurrence of a light quantity loss due to an angular characteristic difference of the dichroic coating. To reduce the light quantity loss, an optical system described in Patent Literature 1 has improved the angular characteristic of a coating, and an optical system described in Patent Literature 2 has designed a prism shape that reduces an incident angle difference between an illumination path and a projection path.

CITATION LIST

Patent Literature

Patent Literature 1: U.S. Pat. No. 7,230,768
Patent Literature 2: JP 2002-287248 A However, even with the angular characteristic of the coating as described in Patent Literature 1, it is difficult to sufficiently reduce the light quantity loss. On the other hand, a complicated prism shape as described in Patent Literature 2 might increase the size of the optical system including the color separating/combining prism and, accordingly, might increase the cost.

SUMMARY

In one or more embodiments, an optical system has a compact and simple configuration and is capable of achieving enhanced luminance efficiency and reduction of light quantity loss on the dichroic coating, and a projector equipped with the optical system.

An optical system according to a first embodiment is a three-plate image projection optical system including: in an order of incidence of illumination light, a color separating/combining prism having a first dichroic coating and a second dichroic coating; a first reflective display element to which illumination light reflected on the first dichroic coating is made incident; a second reflective display element to which illumination light reflected on the second dichroic coating is made incident; and a third reflective display element to which illumination light that has been transmitted through the first and second dichroic coatings is made incident, the three-plate image projection optical system being configured to execute color separation of illumination light by the color separating/combining prism, to illuminate an image display surface of each of the reflective display elements with the illumination light obtained by the color separation, and to execute, by the color separating/combining prism, color combining of projection light that is used for image projection, among reflection light from each of the reflective display elements illuminated, wherein, when a plane including an illumination light axis and a projection light axis on the image display surface of the third reflective display element is defined as a first plane, and when a plane including a surface normal of the first and second dichroic coatings and a surface normal passing through a center of the third reflective display element is defined as a second plane, the first plane and the second plane are in states of being relatively rotated with respect to each other from orthogonal states toward a direction in which an incident angle of the illumination light axis with respect to the first dichroic coating or the second dichroic coating is decreased.

According to the optical system in a second embodiment, the first to third reflective display elements are first to third digital micromirror devices configured to form an image through operation in which, on an image display surface formed with a plurality of micromirrors, ON/OFF control of tilt of each of micromirror surfaces is executed to modulate intensity of illumination light, and the first dichroic coating or the second dichroic coating satisfies the following conditional expression (1).

$$|\cos^{-1}[\{(\sin\alpha\cdot\sin\beta\cdot\sin\theta)/n\}+\cos\beta\sqrt{\{1-(\sin^2\alpha)/n^2\}}]-\cos^{-1}[\{(\sin(\alpha-2\gamma)\cdot\sin\beta\cdot\sin\theta)/n\}+\cos\beta\cdot\sqrt{\{1-(\sin^2(\alpha-2\gamma))/n^2\}}]| \leq 3 \text{ deg} \qquad (1)$$

where, α is an incident angle of the illumination light with respect to the third digital micromirror device, β is an angle formed by a surface normal of the dichroic coating and a normal of the image display surface of the third digital micromirror device, γ is a tilt angle when the micromirror of the third digital micromirror device is in a projection state, n is a refractive index of a glass material of the color separating/combining prism, and θ is a rotation angle from an orthogonal state of the first plane and the second plane.

According to the optical system in a third embodiment, the first plane and the second plane are in states being relatively rotated with respect to each other from an orthogonal state toward a direction in which the incident angle difference between the illumination light and the projection light with respect to the first dichroic coating is decreased.

According to the optical system in a fourth embodiment, the first dichroic coating reflects color light of a green wavelength band.

According to the optical system in a fifth embodiment, the second dichroic coating reflects color light of a blue wavelength band and transmits color light of a red wavelength band.

A projector in a sixth embodiment is a three-plate projector including: three reflective display elements configured to display an image; a light source; an illumination optical system configured to concentrate light from the light source; an optical system according to any one of the above-described first to fifth s, configured to direct light from the illumination optical system toward the reflective display element; and a projection optical system configured to magnify and display, on a screen surface, an image displayed on the reflective display element.

In one or more embodiments, the first plane and the second plane are in states being relatively rotated with respect to each other from an orthogonal state toward a direction in which an incident angle of the illumination light axis with respect to the first dichroic coating or the second dichroic coating is decreased. Accordingly, with this relative tilt between the first and second planes, it is possible to change the incident angle of the illumination light with respect to the first dichroic coating or second dichroic coating. With this configuration, it is possible to alleviate the maximum incident angle with respect to the first or second dichroic coating, and to decrease the light quantity loss in a coating characteristic due to an incident angle difference with respect to the first or second dichroic coating, between the illumination light and the projection light. Accordingly, it is possible to reduce the light quantity loss on the dichroic coating and to enhance luminance efficiency while achieving a compact and simple configuration. By equipping the projector with this optical system, it is possible to achieve a three-plate projector that is compact, bright and has high performance

DETAILED DESCRIPTION OF EMBODIMENTS

Hereinafter, embodiments, or the like, of an optical system and a projector according to the present invention will be described with reference to the drawings. Same reference signs are put to portions in the embodiments, or the like, that are similar or corresponding to each other, and overlapping description will be omitted appropriately.

Figure 1:
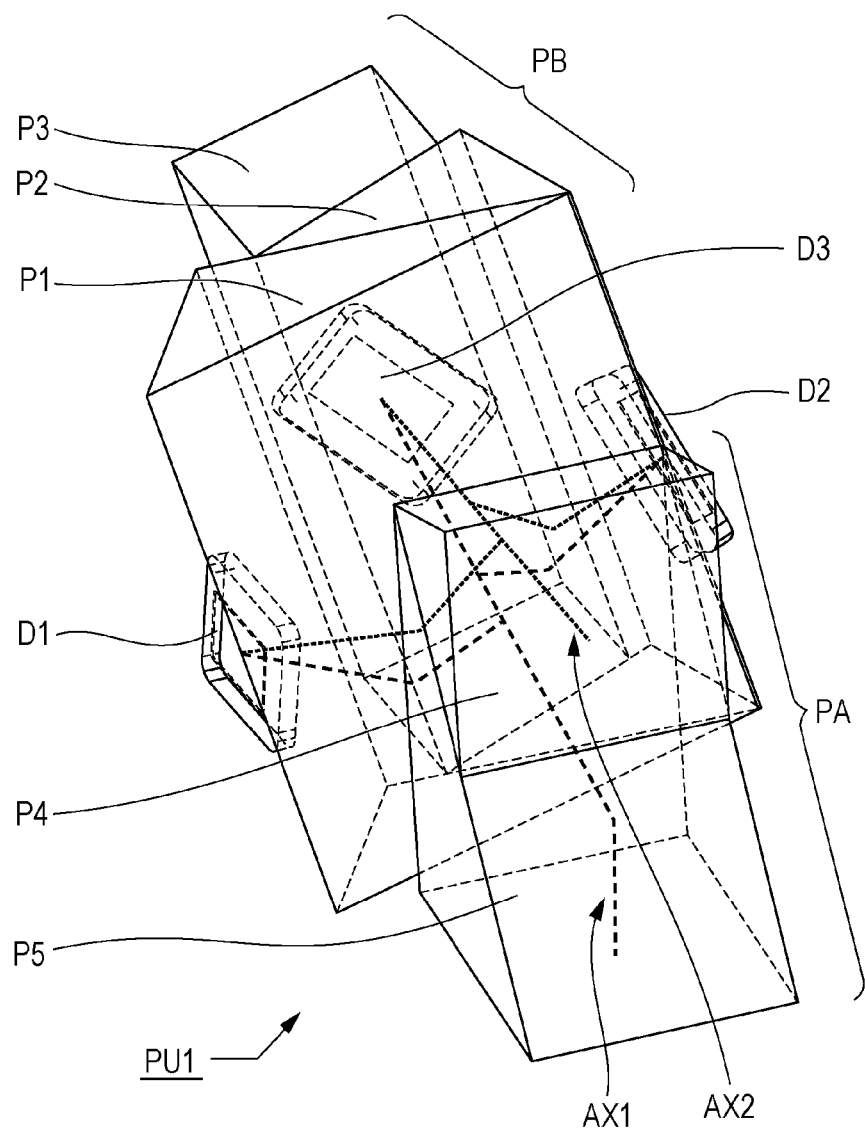
FIG. 1 is a perspective view of an optical system according to one or more embodiments.
Figure 2:
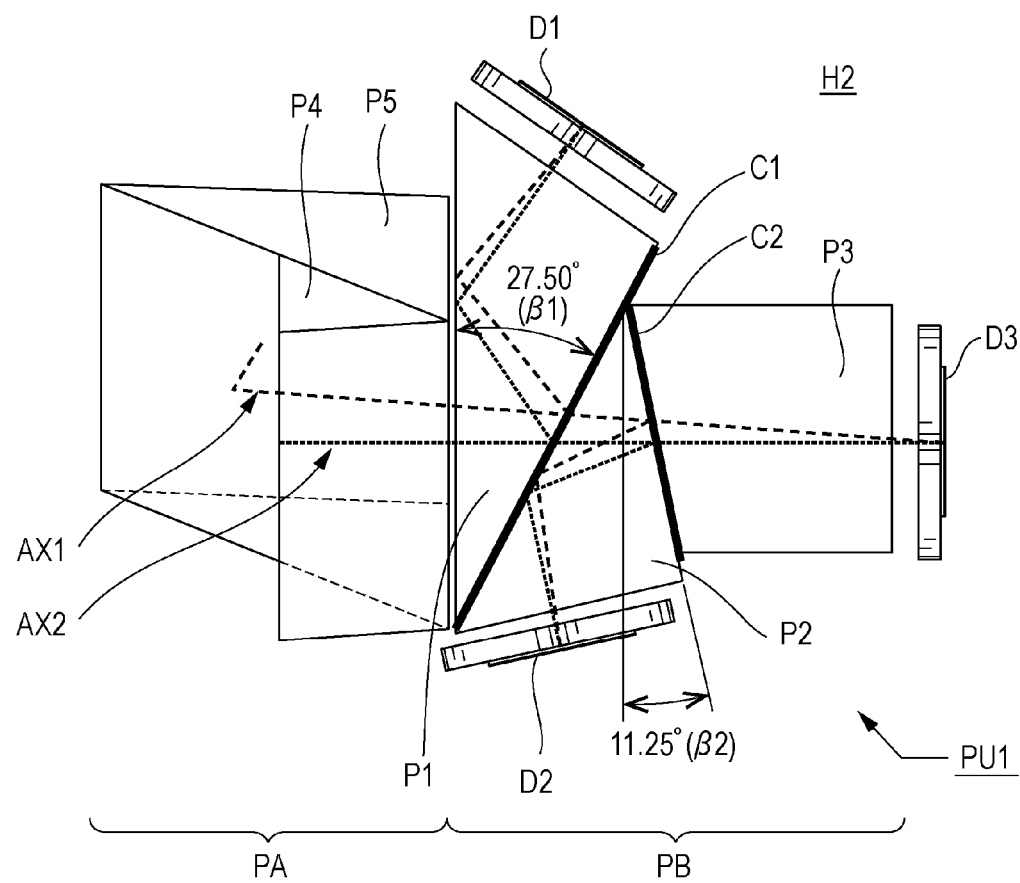
FIG. 2 is a top view of the optical system in FIG. 1.
Figure 3:
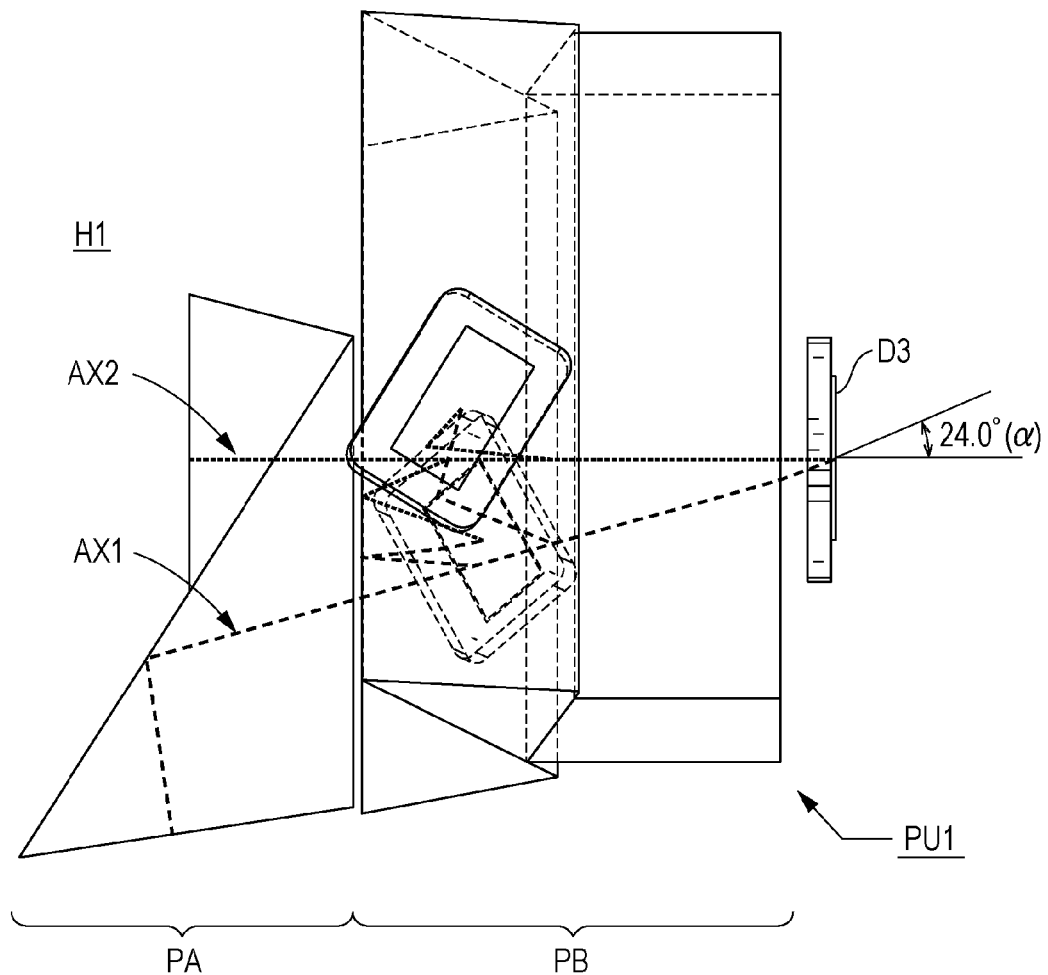
FIG. 3 is a side view of the optical system in FIG. 1.
Figure 4:
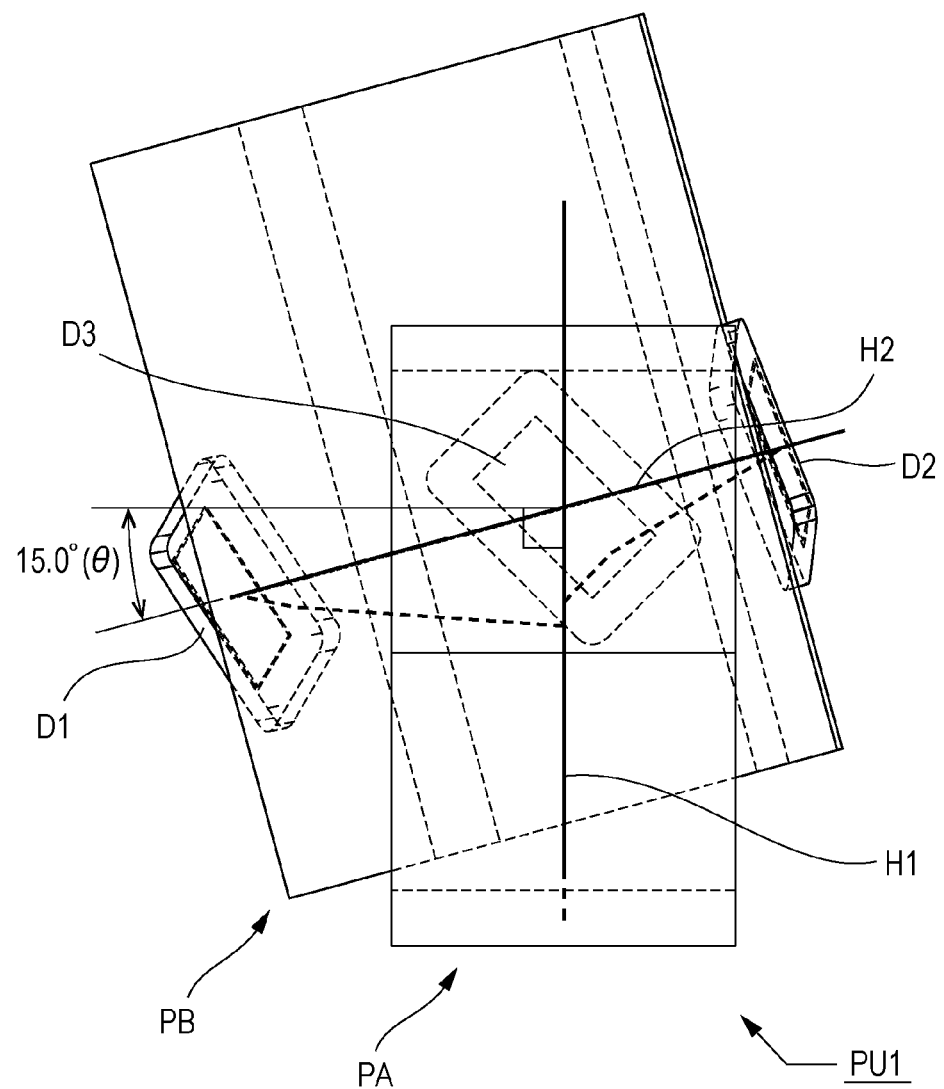
FIG. 4 is a front view of the optical system in FIG. 1.
Figure 5:
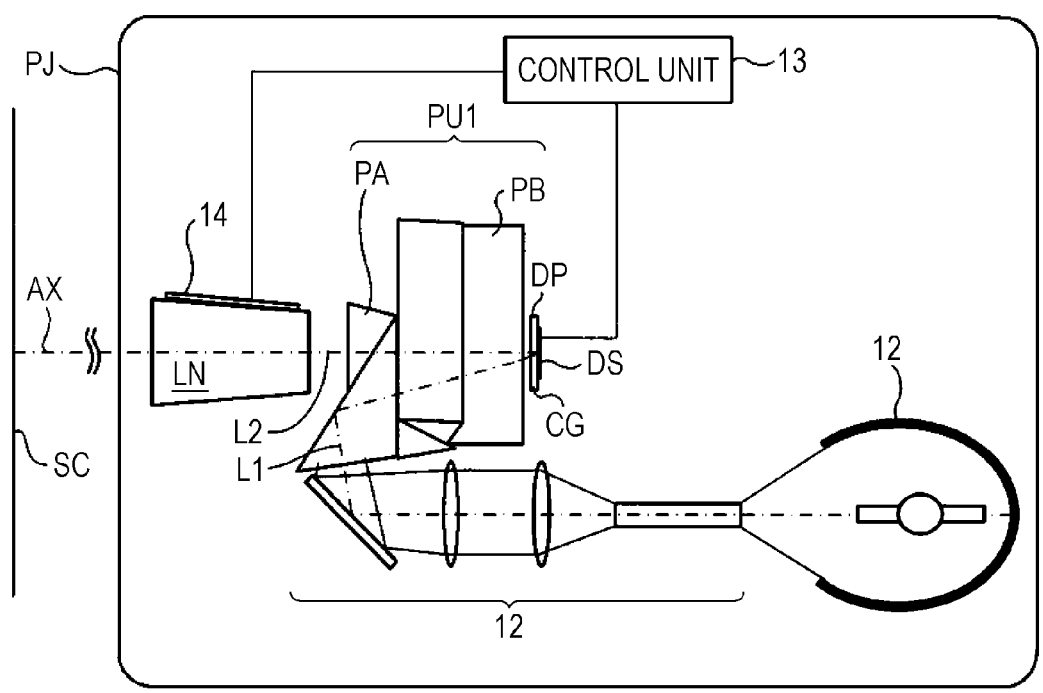
FIG. 5 is a schematic diagram illustrating an exemplary configuration of a projector equipped with the optical system in FIG. 1.
Figure 6:
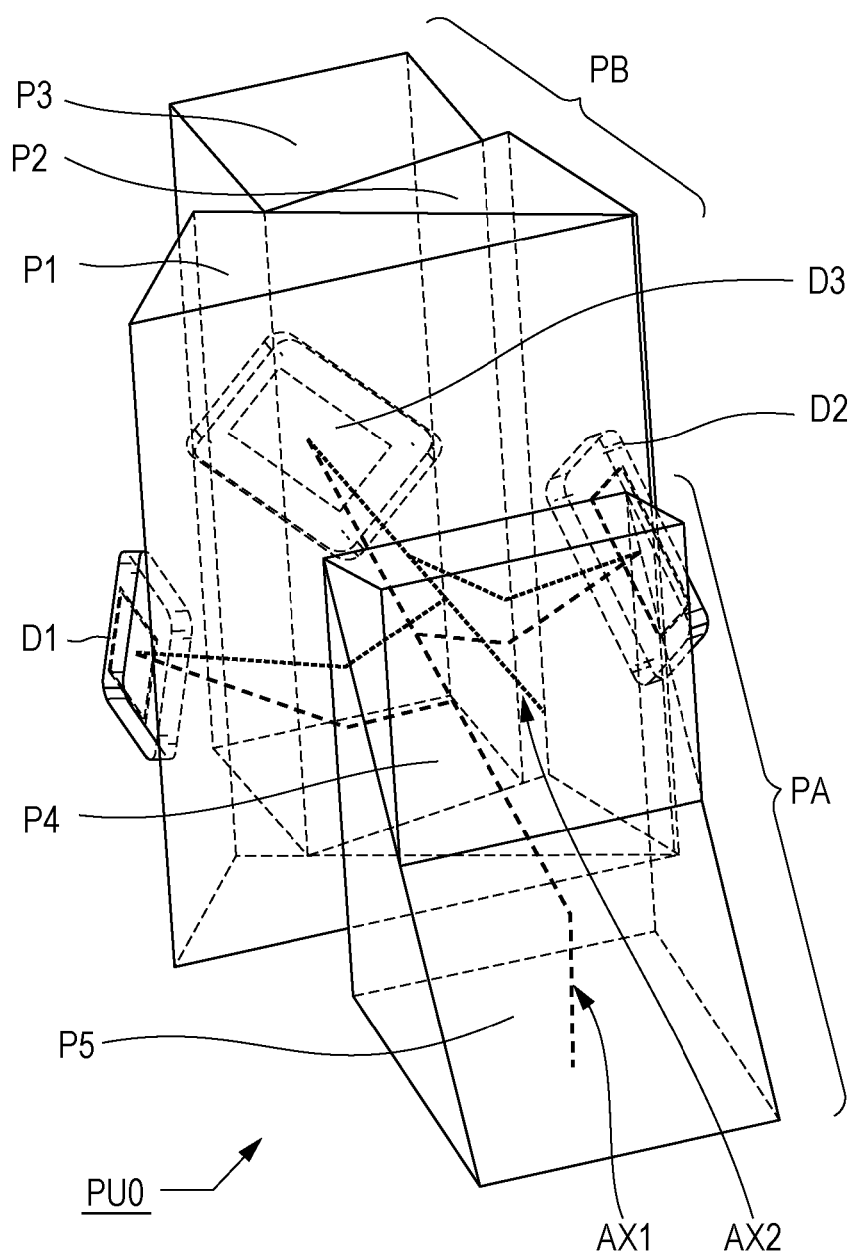
FIG. 6 is a schematic diagram illustrating Comparative Example of an optical system including a conventional color separating/combining prism.

FIGS. 1 to 4 illustrate a first embodiment of an optical system PU1. FIG. 1 illustrates the optical system PU1 viewed from an obliquely upward direction. FIG. 2 illustrates the optical system PU1 viewed from a top side. FIG. 3 illustrates the optical system PU1 viewed from a lateral side. FIG. 4 illustrates the optical system PU1 viewed from a front side. FIG. 5 illustrates an exemplary schematic configuration of a projector PJ equipped with the optical system PU1. The projector PJ includes, as illustrated in FIG. 5, a projection optical system LN, the optical system PU1, a light source 11, an illumination optical system 12, a control unit 13, and an actuator 14, or the like. The optical system PU1 includes a total internal reflection (TIR) prism PA, a color separating/combining prism PB, and a digital micromirror device DP. Overall control of the projector PJ is executed by the control unit 13.

As illustrated in FIG. 5, illumination light L1 emitted from the light source 11 is directed through the illumination optical system 12, the TIR prism PA and the color separating/combining prism PB to the digital micromirror device DP. The digital micromirror device DP is a reflective display element configured to modulate light to generate an image. A cover glass CG is provided on an image display surface DS that displays an image. On the image display surface DS of the digital micromirror device DP, a two-dimensional image is formed by modulating intensity of the illumination light. A pixel of the digital micromirror device DP has a rotation axis having an angle of 45° with respect to each of sides of a rectangular image display region formed with the image display surface DS, and indicates ON/OFF by pivoting around the axis, for example, by ±12°. In addition, light reflected on a micromirror (pixel surface) in an ON state is to be selectively transmitted through the optical system PU1 and the projection optical system LN, as will be described below.

As illustrated in FIGS. 1 to 4, the optical system PU1 is a three-plate image projection optical system. Specifically, the optical system PU1 is a prism system equipped with a prism unit including the TIR prism PA and the color separating/combining prism PB and with a first to third digital micromirror devices D1 to D3 (corresponding to the digital micromirror device DP in FIG. 5), or the like, and executes separation of the illumination light L1 from projection light L2 and separation of the projection light (ON light) L2 from unneeded light (OFF light), which is not illustrated. An image displayed on the digital micromirror device DP is magnified and projected on a screen surface SC by the projection optical system LN. Movement of the projection optical system LN or a portion thereof (e.g. zooming and focusing) is performed by the actuator 14 (FIG. 5).

Figure 7:
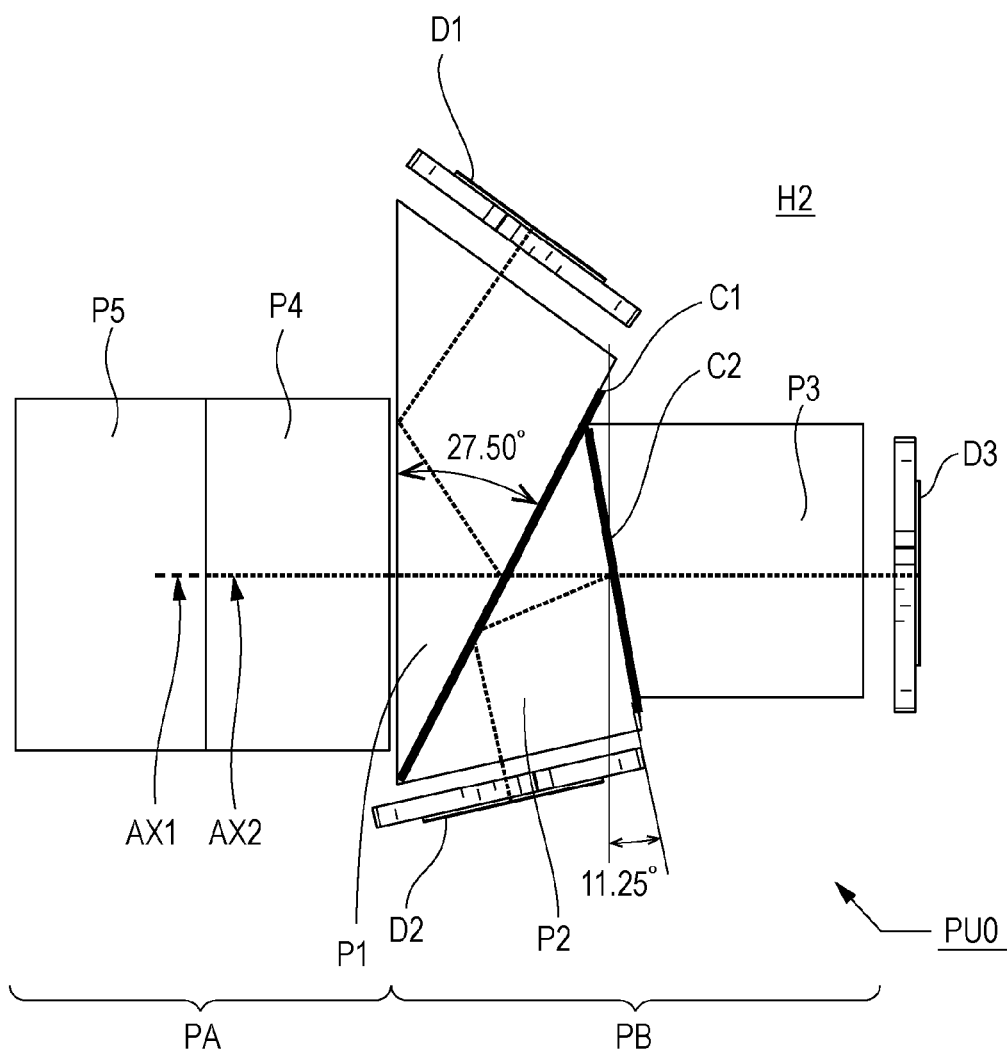
FIG. 7 is a top view of the optical system in FIG. 6.
Figure 8:
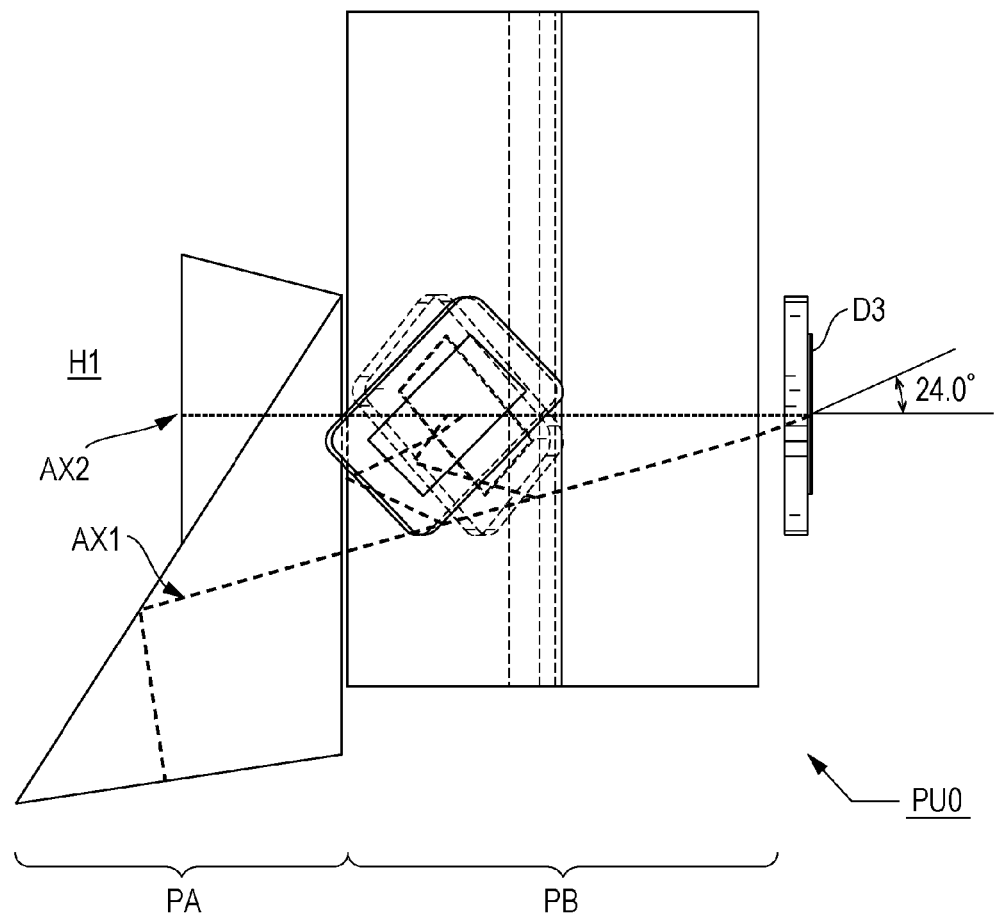
FIG. 8 is a side view of the optical system in FIG. 6.
Figure 9:
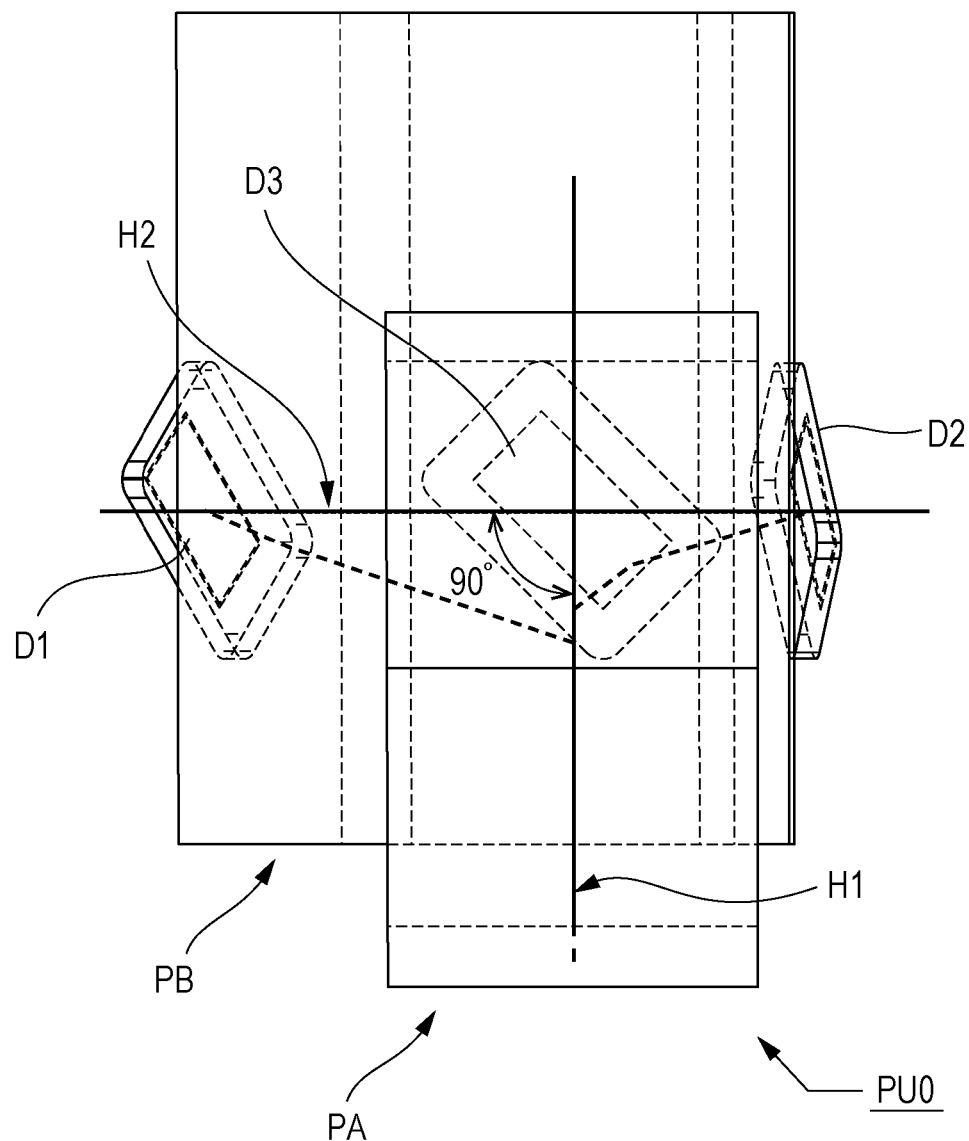
FIG. 9 is a front view of the optical system in FIG. 6.

A configuration of the above-described optical system PU1 to achieve reduction in the light quantity loss will be described more specifically with respect to FIGS. 1 to 4. Additionally, in order to clarify how arrangement differs from a conventional color separating/combining prism PB, a configuration of an optical system PU0 will be illustrated in FIGS. 6 to 9 as Comparative Examples. Similarly to FIGS. 1 to 4, FIG. 6 illustrates the optical system PU0 viewed from an obliquely upward direction. FIG. 7 illustrates the optical system PU0 viewed from a top side. FIG. 8 illustrates the optical system PU0 viewed from a lateral side. FIG. 9 illustrates the optical system PU0 viewed from a front side.

In each of the optical systems PU0 and PU1 (FIGS. 1 to 9), the TIR prism PA is formed with fourth and fifth prisms P4 and P5 having substantially triangular pole shapes and includes an air gap layer between prism slopes. Using the TIR prism PA, separation of the illumination light (input light) L1 toward the first to third digital micromirror devices D1 to D3 from the projection light (output light) L2 is executed. The illumination light L1 emitted from the illumination optical system 12 is made incident on the TIR prism PA. The illumination light L1 is then made incident on a slope forming the air gap layer at an angle that satisfies a total reflection condition, totally reflected, and then made incident on the color separating/combining prism PB.

In each of the optical systems PU0 and PU1, the color separating/combining prism PB has a structure in which three prisms P1, P2, and P3, corresponding to R (red), G (green) and B (blue), are combined with each other. The digital micromirror device DP (FIG. 5) includes first, second, and third digital micromirror devices D1, D2, and D3, each used for each of color light of red, green, and blue. The illumination light L1 is separated into each of colors of red, green, and blue by the color separating/combining prism PB. The three prisms P1, P2, and P3 forming the color separating/combining prism PB includes two prisms with substantially triangular pole shaped prisms and a block shaped prism. Between the first prism P1 and the second prism P2, a first dichroic coating C1 that reflects first color light is provided, and an air gap layer is provided adjacent to the first dichroic coating C1. Between the second prism P2 and the third prism P3, a second dichroic coating C2 that reflects second color light is provided, and an air gap layer is provided adjacent to the second dichroic coating C2.

The illumination light L1 (FIG. 5) that is made incident on the first prism P1 of the color separating/combining prism PB is treated such that the first color light is reflected on the first dichroic coating C1 (FIGS. 2 and 7) and the others, namely, the second color light and the third color light are transmitted. The first color light reflected on the first dichroic coating C1 is totally reflected, thereafter emitted from the color separating/combining prism PB, and then illuminates the first digital micromirror device D1. Among the second color light and the third color light transmitted through the first dichroic coating C1, the second color light is reflected on the second dichroic coating C2 (FIGS. 2 and 7), and the third color light is transmitted through the second dichroic coating C2. The second color light reflected on the second dichroic coating C2 is totally reflected, thereafter emitted from the color separating/combining prism PB, and then illuminates the second digital micromirror device D2. The third color light transmitted through the second dichroic coating C2 is emitted from the color separating/combining prism PB and illuminates the third digital micromirror device D3.

The projection light L2 (FIG. 5) that is formed with the first color light reflected on the first digital micromirror device D1 is made incident on the color separating/combining prism PB, totally reflected, and thereafter, reflected on the first dichroic coating C1. The projection light L2 that is formed with the second color light and reflected on the second digital micromirror device D2 is made incident on the color separating/combining prism PB, totally reflected, thereafter, reflected on the second dichroic coating C2, and then, transmitted through the first dichroic coating C1. The projection light L2 that is formed with the third color light reflected on the third digital micromirror device D3 is made incident on the color separating/combining prism PB, transmitted through the second dichroic coating C2 and the first dichroic coating C1. In this manner, among emitted light from the three digital micromirror devices D1 to D3 that have received the illumination light L1, the projection light L2 to be used for image projection undergoes color combining at the first and second dichroic coatings C1 and C2.

In the optical systems PU0 and PU1, each of the above-describe projection light L2 formed with each of color light of red, green, and blue is combined onto a same light axis AX (FIG. 5). The combined light is emitted from the color separating/combining prism PB and made incident on the TIR prism PA. The projection light L2 that is made incident on the TIR prism PA does not satisfy the total reflection condition here. Accordingly, the projection light L2 is transmitted through the air gap layer and projected on the screen SC by the projection optical system LN.

As illustrated in FIGS. 2 to 4 and FIGS. 7 to 9, a plane including an illumination light axis AX1 and a projection light axis AX2 on the image display surface DS of the third digital micromirror device D3 is defined as a first plane H1, and a plane including a surface normal of each of the first and second dichroic coatings C1 and C2 and a surface normal of a center of the third digital micromirror device D3 is defined as a second plane H2. In the optical system PU0, as illustrated in FIG. 9, the first plane H1 and the second plane H2 are arranged so as to be orthogonal to each other ($\theta=0°$, $\theta$: rotation angle from an orthogonal state of the first plane H1 and the second plane H2). In contrast, as illustrated in FIG. 4, the optical system PU1 has a configuration in which the first plane H1 and the second plane H2 are arranged so as not to be orthogonal to each other. Specifically, the first plane H1 and the second plane H2 are in states being relatively rotated with respect to each other from the orthogonal state toward a direction in which an incident angle of the illumination light axis AX1 with respect to the first dichroic coating C1 or the second dichroic coating C2 is decreased.

Table 1 illustrates a configuration of a dielectric multilayer film of each of the first and second dichroic coatings C1 and C2 in a case where the first color light is red light (R), the second color light is blue light (B), and the third color light is green light (G). Table 2 illustrates a configuration of a dielectric multilayer film of each of the first and second dichroic coatings C1 and C2 in a case where the first color light is green light (G), the second color light is blue light (B), and the third color light is red light (R). Table 3 illustrates a refractive index and wavelength of a thin film material used as the dielectric multilayer film of the first and second dichroic coatings C1 and C2.

TABLE 1

| | FIRST DICHROIC COATING Red BAND REFLECTION | | SECOND DICHROIC COATING Blue BAND REFLECTION | |
|---|---|---|---|---|
| | BK7 | — | BK7 | — |
| Layer_1 | AL2O3 | 72.42 nm | TIO2 | 31.33 nm |
| Layer_2 | NB2O5 | 90.29 nm | AL2O3 + LA2O3 | 45.87 nm |
| Layer_3 | AL2O3 | 116.72 nm | TIO2 | 49.88 nm |
| Layer_4 | NB2O5 | 84.64 nm | AL2O3 + LA2O3 | 67 nm |
| Layer_5 | AL2O3 | 100.59 nm | TIO2 | 44.46 nm |
| Layer_6 | NB2O5 | 87.52 nm | AL2O3 + LA2O3 | 53.75 nm |
| Layer_7 | AL2O3 | 93.8 nm | TIO2 | 45.64 nm |
| Layer_8 | NB2O5 | 84.8 nm | AL2O3 + LA2O3 | 66.02 nm |
| Layer_9 | AL2O3 | 105.07 nm | TIO2 | 48.38 nm |
| Layer_10 | NB2O5 | 75.9 nm | AL2O3 + LA2O3 | 60.27 nm |
| Layer_11 | AL2O3 | 118.53 nm | TIO2 | 44.12 nm |
| Layer_12 | NB2O5 | 68.77 nm | AL2O3 + LA2O3 | 61.17 nm |
| Layer_13 | AL2O3 | 121.42 nm | TIO2 | 48.6 nm |
| Layer_14 | NB2O5 | 71.83 nm | AL2O3 + LA2O3 | 64.49 nm |
| Layer_15 | AL2O3 | 111.56 nm | TIO2 | 46.26 nm |

TABLE 1-continued

|  | FIRST DICHROIC COATING Red BAND REFLECTION | | SECOND DICHROIC COATING Blue BAND REFLECTION | |
|---|---|---|---|---|
|  | BK7 | — | BK7 | — |
| Layer_16 | NB2O5 | 80.06 nm | AL2O3 + LA2O3 | 57.92 nm |
| Layer_17 | AL2O3 | 99.34 nm | TIO2 | 46.73 nm |
| Layer_18 | NB2O5 | 83.87 nm | AL2O3 + LA2O3 | 64.54 nm |
| Layer_19 | AL2O3 | 100.16 nm | TIO2 | 47.98 nm |
| Layer_20 | NB2O5 | 80.41 nm | AL2O3 + LA2O3 | 60.63 nm |
| Layer_21 | AL2O3 | 111.4 nm | TIO2 | 44.88 nm |
| Layer_22 | NB2O5 | 74.44 nm | AL2O3 + LA2O3 | 61.66 nm |
| Layer_23 | AL2O3 | 121.11 nm | TIO2 | 47.66 nm |
| Layer_24 | NB2O5 | 71.96 nm | AL2O3 + LA2O3 | 63.19 nm |
| Layer_25 | AL2O3 | 126.61 nm | TIO2 | 44.74 nm |
| Layer_26 | NB2O5 | 74.03 nm | AL2O3 + LA2O3 | 58.78 nm |
| Layer_27 | SIO2 | 78.22 nm | TIO2 | 46.4 nm |
| Layer_28 | — | — | AL2O3 + LA2O3 | 61.08 nm |
| Layer_29 | — | — | TIO2 | 36.84 nm |
| Layer_30 | — | — | SIO2 | 137.73 nm |
|  | Air | — | Air | — |

TABLE 2

|  | FIRST DICHROIC COATING Green BAND REFLECTION | | SECOND DICHROIC COATING Blue BAND REFLECTION | |
|---|---|---|---|---|
|  | BK7 | — | BK7 | — |
| Layer_1 | AL2O3 + LA2O3 | 61.5 nm | TIO2 | 28.38 nm |
| Layer_2 | TIO2 | 96.38 nm | SIO2 | 53.39 nm |
| Layer_3 | AL2O3 + LA2O3 | 163.13 nm | TIO2 | 55.43 nm |
| Layer_4 | TIO2 | 92.5 nm | SIO2 | 75.71 nm |
| Layer_5 | AL2O3 + LA2O3 | 121.47 nm | TIO2 | 41.83 nm |
| Layer_6 | TIO2 | 170.45 nm | SIO2 | 72.07 nm |
| Layer_7 | AL2O3 + LA2O3 | 237.51 nm | TIO2 | 51.63 nm |
| Layer_8 | TIO2 | 71.74 nm | SIO2 | 80.27 nm |
| Layer_9 | AL2O3 + LA2O3 | 90.53 nm | TIO2 | 47.68 nm |
| Layer_10 | TIO2 | 58.92 nm | SIO2 | 70.1 nm |
| Layer_11 | AL2O3 + LA2O3 | 113.65 nm | TIO2 | 50.95 nm |
| Layer_12 | TIO2 | 5.95 nm | SIO2 | 79.63 nm |
| Layer_13 | AL2O3 + LA2O3 | 136.66 nm | TIO2 | 51.02 nm |
| Layer_14 | TIO2 | 42.77 nm | SIO2 | 69.71 nm |
| Layer_15 | AL2O3 + LA2O3 | 97.09 nm | TIO2 | 51.09 nm |
| Layer_16 | TIO2 | 61.54 nm | SIO2 | 76.84 nm |
| Layer_17 | AL2O3 + LA2O3 | 110.12 nm | TIO2 | 52.24 nm |
| Layer_18 | TIO2 | 27.4 nm | SIO2 | 70.36 nm |
| Layer_19 | AL2O3 + LA2O3 | 104.23 nm | TIO2 | 51.52 nm |
| Layer_20 | TIO2 | 60.36 nm | SIO2 | 75.44 nm |
| Layer_21 | AL2O3 + LA2O3 | 112.34 nm | TIO2 | 52.64 nm |
| Layer_22 | TIO2 | 16.86 nm | SIO2 | 69.87 nm |
| Layer_23 | AL2O3 + LA2O3 | 113.34 nm | TIO2 | 50.76 nm |
| Layer_24 | TIO2 | 58.03 nm | SIO2 | 77.13 nm |
| Layer_25 | AL2O3 + LA2O3 | 86.56 nm | TIO2 | 51.59 nm |
| Layer_26 | TIO2 | 59.98 nm | SIO2 | 72.52 nm |
| Layer_27 | AL2O3 + LA2O3 | 96.54 nm | TIO2 | 47.22 nm |
| Layer_28 | TIO2 | 71.71 nm | SIO2 | 77.34 nm |
| Layer_29 | AL2O3 + LA2O3 | 24.64 nm | TIO2 | 50.94 nm |
| Layer_30 | TIO2 | 63.74 nm | SIO2 | 75.78 nm |
| Layer_31 | AL2O3 + LA2O3 | 108.83 nm | TIO2 | 43.01 nm |
| Layer_32 | TIO2 | 66.07 nm | SIO2 | 68.07 nm |
| Layer_33 | AL2O3 + LA2O3 | 51.8 nm | TIO2 | 46.62 nm |
| Layer_34 | TIO2 | 75.42 nm | SIO2 | 141.68 nm |
| Layer_35 | AL2O3 + LA2O3 | 248.74 nm | — | — |
| Layer_36 | TIO2 | 45.68 nm | — | — |
| Layer_37 | AL2O3 + LA2O3 | 139.86 nm | — | — |
| Layer_38 | TIO2 | 125.66 nm | — | — |
| Layer_39 | SIO2 | 86.64 nm | — | — |
|  | Air | — | Air | — |

TABLE 3

| WAVELENGTH | REFRACTIVE INDEX | | | | |
|---|---|---|---|---|---|
|  | AL2O3 | NB2O5 | SIO2 | TIO2 | AL2O3 + LA2O3 |
| 450 nm | 1.645 | 2.473 | 1.454 | 2.521 | 1.752 |
| 550 nm | 1.632 | 2.382 | 1.445 | 2.406 | 1.737 |
| 650 nm | 1.625 | 2.339 | 1.439 | 2.350 | 1.728 |

Figure 10:
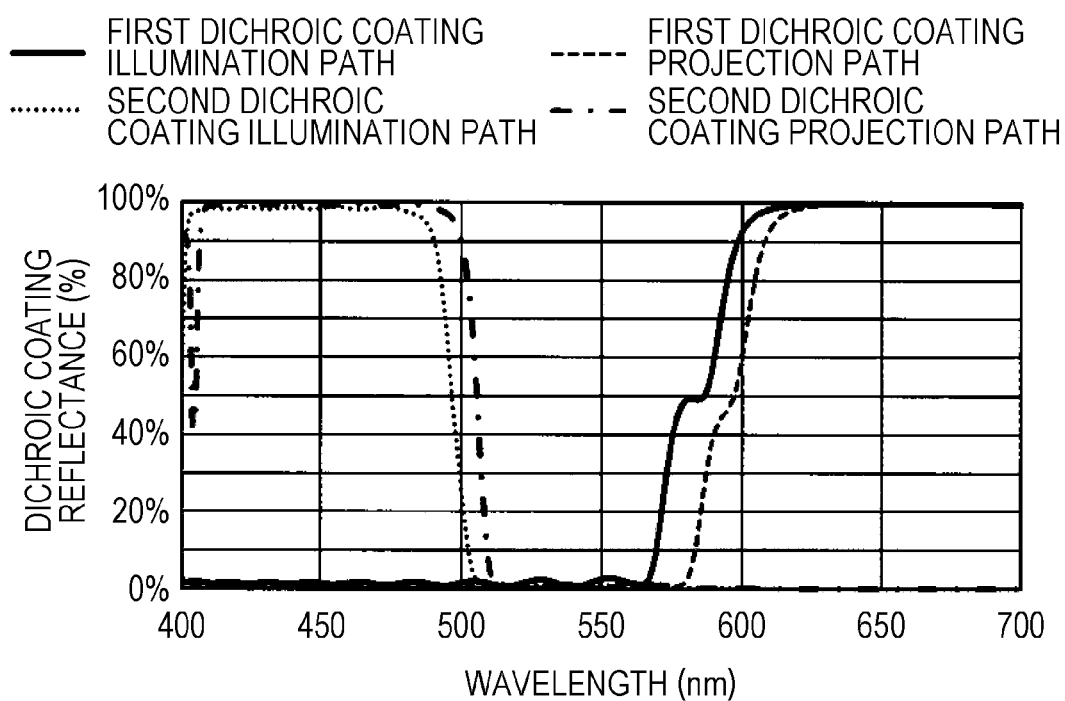
FIG. 10 is a graph illustrating a spectral characteristic of each of first and second dichroic coatings in an optical unit ($\theta=0°$) in Comparative Example.

FIG. 10 illustrates a spectral reflectance characteristic of each of the first and second dichroic coatings C1 and C2 (dielectric multilayer film configuration illustrated in Table 1) in the optical system PU0 (Comparative Example, θ=0°). In FIG. 10, the solid line represents reflectance (%) in an illumination path of the first dichroic coating C1, the broken line represents reflectance (%) in a projection path of the first dichroic coating C1, the dotted line represents reflectance (%) in an illumination path of the second dichroic coating C2, and the one-dotted chain line represents reflectance (%) in a projection path of the second dichroic coating C2.

In the optical system PU0, the incident angle with respect to a dichroic coating surface differs between the illumination path and the projection path. Accordingly, a characteristic of the coating is shifted, as can been seen from FIG. 10. In addition, on the first dichroic coating C1 surface on which the incident angle is increased, a characteristic difference due to polarized light is also increased, leading to deterioration in rising performance at cutoff. When the characteristic difference is increased, since reflection/transmission conditions differ between the illumination path and the projection path, there would be stray light inside a prism, leading to an increase in light quantity loss. In addition, the rising performance at cutoff is associated with color separation performance, and therefore might be a factor of deterioration of color purity.

In one or more embodiments, the optical system PU1 (FIGS. 1 to 4) has a configuration, as described earlier, in which the first plane H1 and the second plane H2 are in states being relatively rotated with respect to each other from an orthogonal state toward a direction in which an incident angle of the illumination light axis AX1 with respect to the first dichroic coating C1 or the second dichroic coating C2 is decreased. With this configuration, the first plane H1 and the second plane H2 are in states being relatively rotated with respect to each other from the orthogonal state toward the direction in which the incident angle of the illumination light axis AX1 with respect to the first dichroic coating C1 or the second dichroic coating C2 is decreased. Accordingly, with this relative tilt between the first and second planes H1 and H2 with respect to each other, it is possible to change the incident angle of the illumination light L1 with respect to the first dichroic coating C1 or the second dichroic coating C2.

When the incident angle of the illumination light L1 is changed, it is possible to alleviate the maximum incident angle with respect to the first dichroic coating C1 or the second dichroic coating C2, and to reduce the light quantity loss (light quantity loss on the color separating/combining prism PB) in a coating characteristic due to the incident angle difference with respect to the first dichroic coating C1 or the second dichroic coating C2, between the illumination light L1 and the projection light L2. Accordingly, it is possible to reduce the light quantity loss on the first dichroic coating C1 or the second dichroic coating C2 and to enhance luminance efficiency while achieving compact and simple configuration. By providing the projector PJ (FIG. 5) with this optical system PU1, it is possible to achieve miniaturization, cost reduction, and enhanced luminance efficiency, or the like, in the three-plate projector PJ.

It is more desirable to configure such that the first plane H1 and the second plane H2 are in states being relatively rotated with respect to each other from an orthogonal state toward a direction in which an incident angle difference between the illumination light L1 and the projection light L2 with respect to the first dichroic coating C1 is decreased. By restricting the rotation angle with respect to the first dichroic coating C1 surface, it is possible to achieve an additionally higher effect.

The next discussion will be quantification of the configuration (FIG. 4) in which the first plane H1 and the second plane H2 are arranged so as not to be orthogonal to each other. First, an illumination path incident angle $AOI_{ill}$ and a projection path incident angle $AOI_{on}$, from an inside of a prism to a dichroic coating surface, can be obtained by the following expressions (A1) and (A2).

$$AOI_{ill}=\cos^{-1}[\{(\sin\alpha\cdot\sin\beta\cdot\sin\theta)/n\}+\cos\beta\cdot\sqrt{\{1-(\sin^2\alpha)/n^2\}}]  \quad (A1)$$

$$AOI_{on}=\cos^{-1}[\{(\sin(\alpha-2\cdot\gamma)\cdot\sin\beta\cdot\sin\theta)/n\}+\cos\beta\cdot\sqrt{\{1-(\sin^2(\alpha-2\cdot\gamma))/n^2\}}] \quad (A2)$$

where, α is an incident angle of the illumination light with respect to the third digital micromirror device, β is an angle formed by a surface normal of the dichroic coating and a normal of the image display surface of the third digital micromirror device, γ is a tilt angle when the micromirror of the third digital micromirror device is in a projection state, n is a refractive index of a glass material of the color separating/combining prism, and θ is a rotation angle from an orthogonal state of the first plane and the second plane.

Subsequently, when considering an incident angle difference $|AOI_{ill}-AOI_{on}|$ that is effective in a case where the first to third digital micromirror devices D1 to D3 are used as reflective display elements (that is, in a case where an element configuration is such that, on the image display surface DS formed with a plurality of micromirrors, ON/OFF control of the tilt of each of micromirror surfaces is executed to modulate intensity of the illumination light L1, thereby forming an image), it is desirable that the first dichroic coating C1 or the second dichroic coating C2 satisfies the following conditional expression (1).

$$|\cos^{-1}[\{(\sin\alpha\cdot\sin\beta\cdot\sin\theta)/n\}+\cos\beta\cdot\sqrt{\{1-(\sin^2\alpha)/n^2\}}]-\cos^{-1}[\{(\sin(\alpha-2\cdot\gamma)\cdot\sin\beta\cdot\sin\theta)/n\}+\cos\beta\cdot\sqrt{\{1-(\sin^2(\alpha-2\cdot\gamma))/n^2\}}]|\leq 3 \text{ deg} \quad (1)$$

where, α is an incident angle of the illumination light with respect to the third digital micromirror device, β is an angle formed by a surface normal of the dichroic coating and a normal of the image display surface of the third digital micromirror device, γ is a tilt angle when the micromirror of the third digital micromirror device is in a projection state, n is a refractive index of a glass material of the color separating/combining prism, and θ is a rotation angle from an orthogonal state of the first plane and the second plane.

Table 4 illustrates an incident angles $AOI_{ill}$ and $AOI_{on}$, and the incident angle difference $|AOI_{ill}-AOI_{on}|$ in a case where the angle α=24°, an angle β1 related to the first dichroic coating C1=27.5°, an angle β2 related to the second dichroic coating C2=−11.25°, the tilt angle γ=12°, and the refractive index n=1.5168. Note that Comparative Example illustrates a state where the rotation angle θ=0° (orthogonal state), Example 2 illustrates a state where the rotation angle θ=3.5°, and Example 1 illustrates a state where the rotation angle θ=15°.

TABLE 4

| ROTATION ANGLE θ | DICHROIC COATING | INCIDENT ANGLE WITH RESPECT TO COATING SURFACE | | INCIDENT ANGLE DIFFERENCE: VALUE CORRESPONDING TO CONDITIONAL EXPRESSION (1) |
|---|---|---|---|---|
| | | ILLUMINATION LIGHT ($AOI_{ill}$) | PROJECTION LIGHT ($AOI_{on}$) | |
| 0° (COMPARATIVE EXAMPLE) | FIRST | 31.29° | 27.50° | 3.79° |
| | SECOND | 19.11° | 11.25° | 7.86° |
| 3.5° (EXAMPLE 2) | FIRST | 30.45° | 27.50° | 2.95° |
| | SECOND | 19.67° | 11.25° | 8.42° |
| 15° (EXAMPLE 1) | FIRST | 27.55° | 27.50° | 0.05° |
| | SECOND | 21.36° | 11.25° | 10.11° |

By relatively rotating the first plane H1 and the second plane H2 by 15° (Example 1), the illumination light incident angle $AOI_{ill}$ at the first dichroic coating C1 surface is alleviated from 31.29° to 27.55°, with the incident angle difference being reduced from 3.79° to 0.05°. While using same conditions excluding rotation, when the rotation angle θ is set to 3.5° (Example 2), the incident angle difference $|AOI_{ill}-AOI_{on}|$ would be 2.95°, which satisfies the conditional expression (1) with a substantially boundary value.

Figure 11:
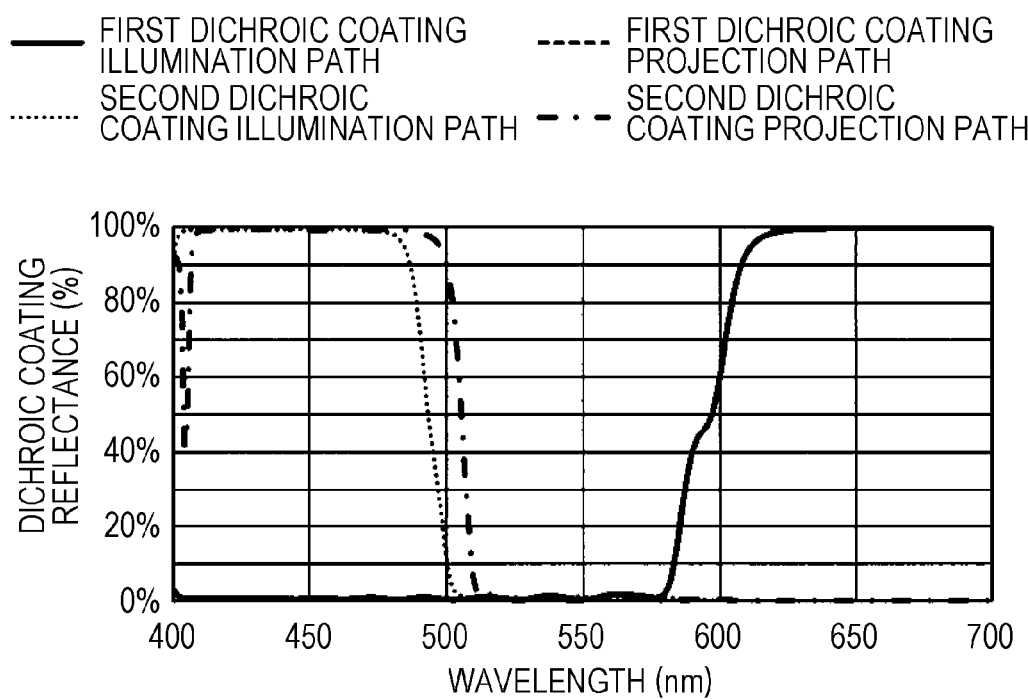
FIG. 11 is a graph illustrating a spectral characteristic of each of first and second dichroic coatings in an optical unit ($\theta=15°$) in Example 1.

FIG. 11 illustrates a spectral reflectance characteristic of each of the first and second dichroic coatings C1 and C2 (dielectric multilayer film configuration illustrated in Table 1) in the optical system PU1 (Example 1, θ=15°). In FIG. 11, the solid line represents reflectance (%) in an illumination path of the first dichroic coating C1, the broken line represents reflectance (%) in a projection path of the first dichroic coating C1, the dotted line represents reflectance (%) in an illumination path of the second dichroic coating C2, and the one-dotted chain line represents reflectance (%) in a projection path of the second dichroic coating C2. It can be seen from FIG. 11 that rising characteristic of the illumination path at the first dichroic coating C1 has improved and characteristic difference between the illumination path and that the projection path has been decreased.

Figure 12:
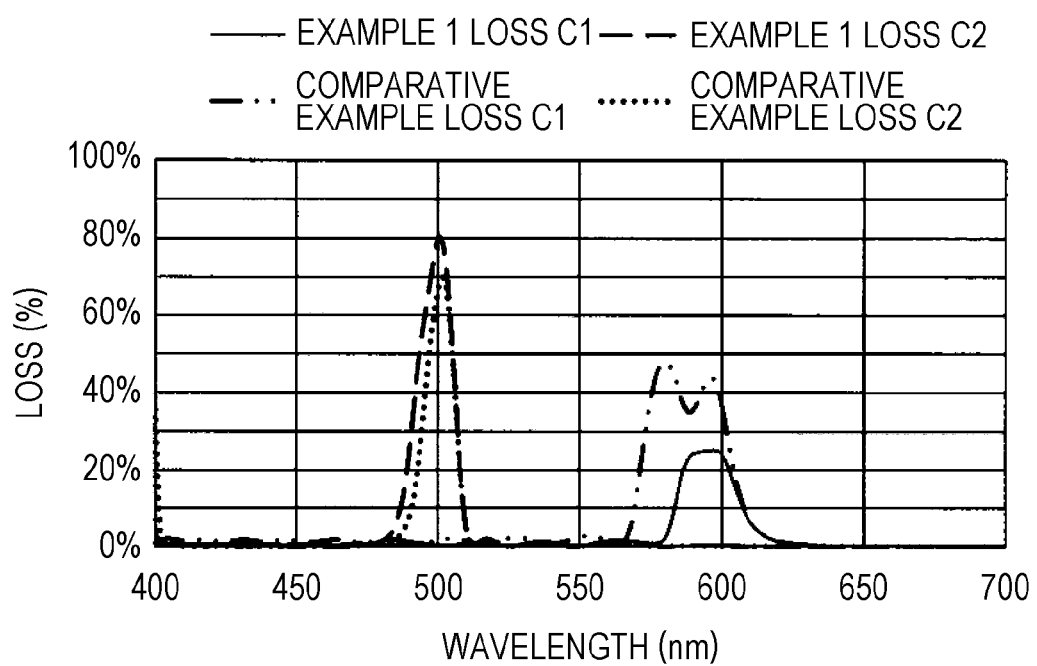
FIG. 12 is a graph illustrating a light quantity loss on each of the first and second dichroic coatings in the optical units ($\theta=0°$, 15°) in Comparative Example and Example 1.

FIG. 12 illustrates a light quantity loss due to a coating characteristic in each of the optical system PU0 (Comparative Example, θ=0°) and the optical system PU1 (Example 1, θ=15°). In FIG. 12, the solid line represents a light quantity loss (%) on the first dichroic coating C1 in Example 1, the broke line represents a light quantity loss (%) on the second dichroic coating C2 in Example 1, the two-dotted chain line represents a light quantity loss (%) on the first dichroic coating C1 in Comparative Example, and the dotted line represents a light quantity loss (%) on the second dichroic coating C2 in Comparative Example. It can be seen from FIG. 12 that, although the loss is slightly increased on the second dichroic coating C2, the light quantity loss on the first dichroic coating C1 has been significantly reduced (area ratio of loss: about 25%).

Figure 13:
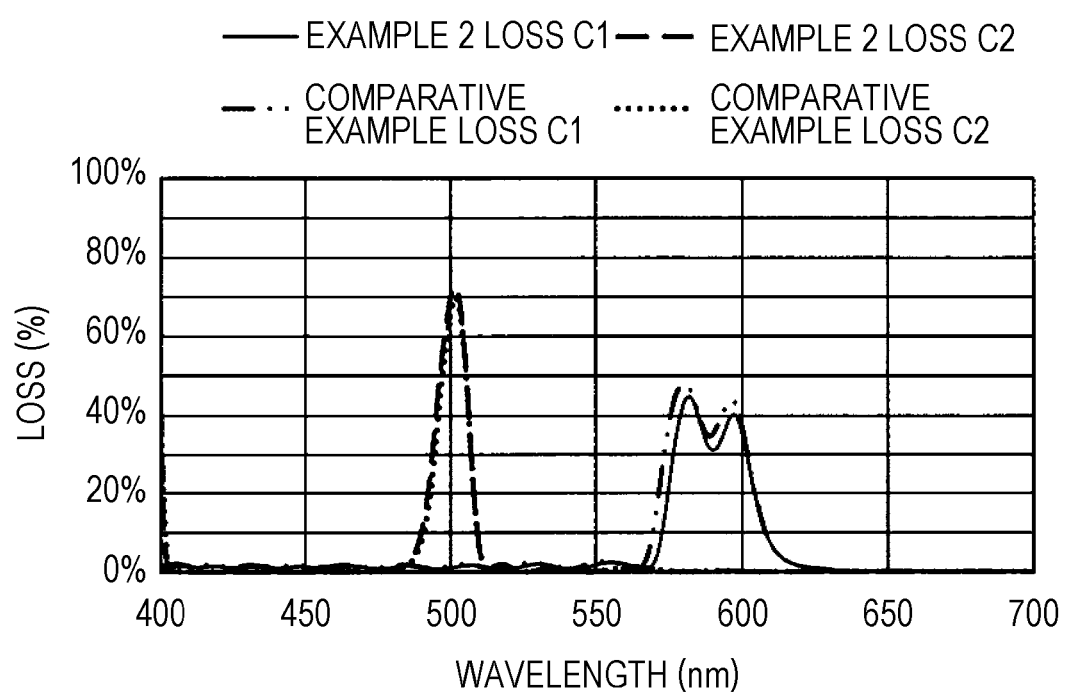
FIG. 13 is a graph illustrating a light quantity loss on each of the first and second dichroic coatings in the optical units ($\theta=0°$, 3.5°) in Comparative Example and Example 2.

FIG. 13 illustrates a light quantity loss due to a coating characteristic in each of the optical system PU0 (Comparative Example, θ=0°) and the optical system PU1 (Example 2, θ=3.5°). In FIG. 13, the solid line represents a light quantity loss (%) on the first dichroic coating C1 in Example 2, the broke line represents a light quantity loss (%) on the second dichroic coating C2 in Example 2, the two-dotted chain line represents a light quantity loss (%) on the first dichroic coating C1 in Comparative Example, and the dotted line represents a light quantity loss (%) on the second dichroic coating C2 in Comparative Example. As illustrated in FIG. 13, even when the degree of rotation produces the incident angle difference of 3° or less, the light quantity loss has improved (area ratio of loss: about 7%).

Accordingly, by satisfying the conditional expression (1), it is possible to effectively reduce the light quantity loss on the dichroic coatings C1 and C2 and to further enhanced luminance efficiency while achieving compact and simple configuration.

Figure 14:
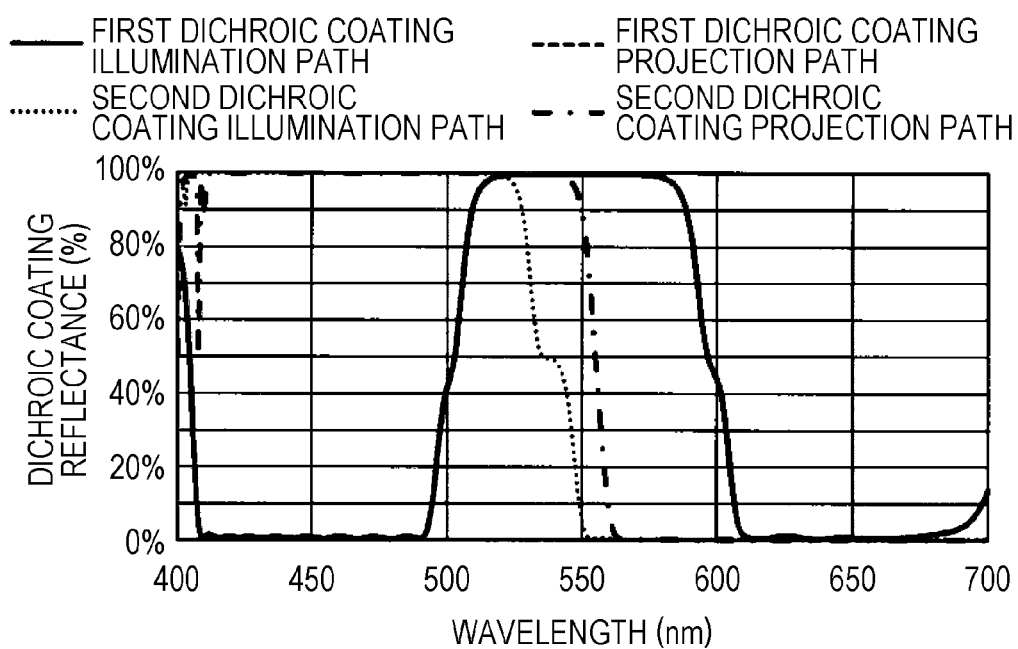
FIG. 14 is a graph illustrating a spectral characteristic of each of first and second dichroic coatings in an optical unit ($\theta=15°$) in Example 3.

FIG. 14 illustrates a spectral reflectance characteristic of each of the first and second dichroic coatings C1 and C2 (dielectric multilayer film configuration illustrated in Table 2) in the optical system PU1 (Example 3, θ=15°). In FIG. 14, the solid line represents reflectance (%) in an illumination path of the first dichroic coating C1, the broken line represents reflectance (%) in a projection path of the first dichroic coating C1, the dotted line represents reflectance (%) in an illumination path of the second dichroic coating C2, and the one-dotted chain line represents reflectance (%) in a projection path of the second dichroic coating C2.

The first color light (G) of the green wavelength band is reflected on the first dichroic coating C1. The second color light (B) of the blue wavelength band is reflected on the second dichroic coating C2, and the third color light (R) of the red wavelength band is transmitted through the second dichroic coating C2. In this manner, it is desirable that the first dichroic coating C1 reflects the color light (G) of the green wavelength band. It is more desirable that the second dichroic coating C2 reflects the color light (B) of the blue wavelength band and transmits the red light (R) of the red wavelength band. With this configuration, by initially separating the green wavelength band and by subsequently separating, at that band, the blue wavelength band and the red wavelength band, it is possible, even when the angular characteristic on the second dichroic coating C2 is increased, to become less affected by the increase.

Figure 15:
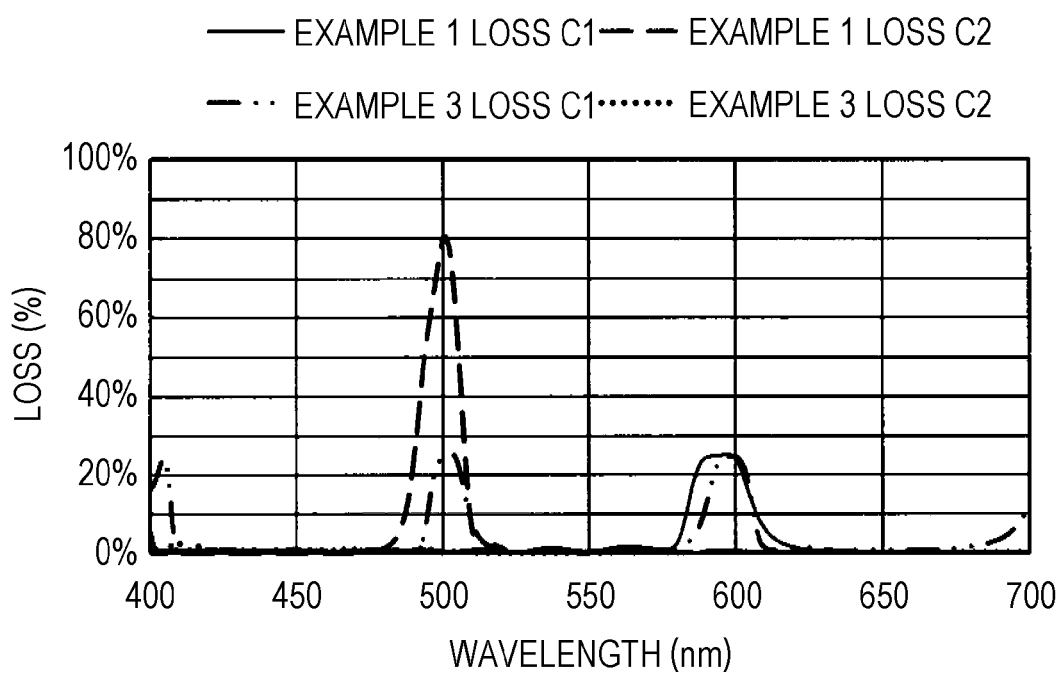
FIG. 15 is a graph illustrating a light quantity loss on each of the first and second dichroic coatings in the optical units ($\theta=15°$) in Examples 1 and 3.

FIG. 15 illustrates a light quantity loss due to a coating characteristic in each of the optical system PU1 (Example 1, θ=15°) and the optical system PU1 (Example 3, θ=15°). In FIG. 15, the solid line represents a light quantity loss (%) on the first dichroic coating C1 in Example 1, the broke line represents a light quantity loss (%) on the second dichroic coating C2 in Example 1, the two-dotted chain line represents a light quantity loss (%) on the first dichroic coating C1 in Example 3, and the dotted line represents a light quantity loss (%) on the second dichroic coating C2 in Example 3.

According to Example 3, it is possible to reduce light quantity loss more significantly than in Example 1 (area ratio of loss: about 52%). Additionally, in Example 3, color light (R) of a red wavelength band, which has high relative luminous sensitivity, is transmitted as a characteristic of the second dichroic coating C2. By transmitting the red light color through the air gaps inside the color separating/combining prism PB twice, it would be possible to apply a counter against aberration with the third digital micromirror device D3 rather than the second micromirror device D2, leading to an expectation of achieving high imaging performance

REFERENCE SIGNS LIST

PJ projector
LN projection optical system
PU0, PU1 optical system
DP digital micromirror device (reflective display element)
D1 first digital micromirror device (reflective display element)
D2 second digital micromirror device (reflective display element)
D3 third digital micromirror device (reflective display element)
DS image display surface
PA TIR prism
PB color separating/combining prism
P1 first prism
P2 second prism
P3 third prism
C1 first dichroic coating
C2 second dichroic coating
H1 first plane
H2 second plane
L1 illumination light
L2 projection light
AX1 illumination light axis
AX2 projection light axis
SC screen
11 light source
12 illumination optical system
13 control unit
14 actuator
AX light axis Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A three-plate image projection optical system comprising:
   in an order of incidence of illumination light,
   a color separating/combining prism having a first dichroic coating and a second dichroic coating;
   a first reflective display element to which illumination light reflected on the first dichroic coating is made incident;
   a second reflective display element to which illumination light reflected on the second dichroic coating is made incident; and
   a third reflective display element to which illumination light that has been transmitted through the first and second dichroic coatings is made incident,
   wherein the color separating/combining prism executes color separation of illumination light to illuminate an image display surface of each of the reflective display elements with the illumination light obtained by color separation, and executes color combining of projection light that is used for image projection, among reflection light from each of the reflective display elements illuminated, wherein, when a plane including an illumination light axis and a projection light axis on the image display surface of the third reflective display element is defined as a first plane, and when a plane including a surface normal of the first and second dichroic coatings and a surface normal passing through a center of the third reflective display element is defined as a second plane, the first plane and the second plane are at positions after rotation about the projection light axis from a first orientation wherein a first normal of the first plane and a second normal of the second plane are orthogonal toward a second orientation in which an incident angle of the illumination light axis with respect to the first dichroic coating or the second dichroic coating is decreased.

2. The optical system according to claim 1 wherein the first plane and the second plane are at positions after rotation about the projection light axis from a first orientation wherein a first normal of the first plane and a second normal of the second plane are orthogonal toward a second orientation in which the incident angle difference between the illumination light and the projection light with respect to the first dichroic coating is decreased.

3. The optical system according to claim 1, wherein the first dichroic coating reflects color light of a green wavelength band.

4. The optical system according to claim 1 wherein the second dichroic coating reflects color light of a blue wavelength band and transmits color light of a red wavelength band.

5. The optical system according to claim 2, wherein the first plane and the second plane are at positions after rotation about the projection light axis from a first orientation wherein a first normal of the first plane and a second normal of the second plane are orthogonal toward a second orientation in which the incident angle difference between the illumination light and the projection light with respect to the first dichroic coating is decreased.

6. The optical system according to claim 1,
wherein the first dichroic coating or the second dichroic coating satisfies the following conditional expression (1):

$$|\cos^{-1}[\{(\sin\alpha\cdot\sin\beta\cdot\sin\theta)/n\}+\cos\beta\cdot\sqrt{1-(\sin^2\alpha)/n^2}]-\cos^{-1}[\{(\sin(\alpha-2\cdot\gamma)\cdot\sin\beta\cdot\sin\theta)/n\}+\cos\beta\cdot\sqrt{1-(\sin^2(\alpha-2\cdot\gamma))/n^2}]|\leq 3 \text{ deg} \quad (1),$$

where, $\alpha$ is an incident angle of the illumination light with respect to the third reflective display element, $\beta$ is an angle formed by a surface normal of the dichroic coating and a normal of the image display surface of the third reflective display element, $\gamma$ is a tilt angle when the micromirror of the third reflective display element is in a projection state, n is a refractive index of a glass material of the color separating/combining prism, and $\theta$ is a rotation angle from an orthogonal state of the first plane and the second plane.

7. A three-plate image projection optical system comprising:
in an order of incidence of illumination light,
a color separating/combining prism having a first dichroic coating and a second dichroic coating;
first to third digital micromirror devices that form an image through operation in which, on an image display surface formed with a plurality of micromirrors, ON/OFF control of tilt of each of micromirror surfaces is executed to modulate intensity of illumination light;
a first digital micromirror device to which illumination light reflected on the first dichroic coating is made incident;
a second digital micromirror device to which illumination light reflected on the second dichroic coating is made incident; and
a third digital micromirror device to which illumination light that has been transmitted through the first and second dichroic coatings is made incident,
wherein the color separating/combining prism executes color separation of illumination light to illuminate an image display surface of each of the digital micromirror devices with the illumination light obtained by color separation, and executes color combining of projection light that is used for image projection, among reflection light from each of the digital micromirror devices illuminated,
wherein, when a plane including an illumination light axis and a projection light axis on the image display surface of the third digital micromirror device is defined as a first plane, and when a plane including a surface normal of the first and second dichroic coatings and a surface normal passing through a center of the third digital micromirror device is defined as a second plane,
the first plane and the second plane are at positions after rotation about the projection light axis from a first orientation wherein a first normal of the first plane and a second normal of the second plane are orthogonal toward a second orientation in which an incident angle of the illumination light axis with respect to the first dichroic coating or the second dichroic coating is decreased.

8. The optical system according to claim 7, wherein the first dichroic coating or the second dichroic coating satisfies the following conditional expression (1):

$$|\cos^{-1}[\{(\sin\alpha\cdot\sin\beta\cdot\sin\theta)/n\}+\cos\beta\cdot\sqrt{1-(\sin^2\alpha)/n^2}]-\cos^{-1}[\{(\sin(\alpha-2\cdot\gamma)\cdot\sin\beta\cdot\sin\theta)/n\}+\cos\beta\cdot\sqrt{1-(\sin^2(\alpha-2\cdot\gamma))/n^2}]|\leq 3 \text{ deg} \quad (1),$$

where, $\alpha$ is an incident angle of the illumination light with respect to the third digital micromirror device, $\beta$ is an angle formed by a surface normal of the dichroic coating and a normal of the image display surface of the third digital micromirror device, $\gamma$ is a tilt angle when the micromirror of the third digital micromirror device is in a projection state, n is a refractive index of a glass material of the color separating/combining prism, and $\theta$ is a rotation angle from an orthogonal state of the first plane and the second plane.

9. The optical system according to claim 8, wherein the first dichroic coating reflects color light of a green wavelength band.

10. The optical system according to claim 9, wherein the second dichroic coating reflects color light of a blue wavelength band and transmits color light of a red wavelength band.

11. The optical system according to claim 8, wherein the first plane and the second plane are at positions after rotation about the projection light axis from a first orientation wherein a first normal of the first plane and a second normal of the second plane are orthogonal toward a second orientation in which the incident angle difference between the illumination light and the projection light with respect to the first dichroic coating is decreased.

12. A three-plate projector comprising:
three digital micromirror devices that display an image;
a light source;
an illumination optical system that concentrates light from the light source;
an optical system according to claim 8 that directs light from the illumination optical system toward the digital micromirror device; and
a projection optical system that magnifies and projects, on a screen surface, an image displayed on the digital micromirror device.

13. An image projection optical system comprising:
a color separating/combining prism having a dichroic coating; and
a reflective display element to which illumination light that has been transmitted through the dichroic coating is made incident,
the image projection optical system that executes color separation of the illumination light by the color separating/combining prism, to illuminate an image display surface of the reflective display element with the illumination light obtained by color separation, and to execute projecting of projection light that is used for image projection, among reflection light from the reflective display element illuminated,
wherein, when a plane including an illumination light axis and a projection light axis on the image display surface of the reflective display element is defined as a first plane, and when a plane including a surface normal of the dichroic coating and a surface normal passing through a center of the reflective display element is defined as a second plane,
the first plane and the second plane are in states of being at positions after rotation about the projection light axis from a first orientation wherein a first normal of the first plane and a second normal of the second plane are orthogonal toward a second orientation in which an incident angle of the illumination light axis with respect to the dichroic coating is decreased.

14. The optical system according to claim 13,
wherein the image display surface formed with a plurality of micromirrors,
ON/OFF control of tilt of each of the plurality of micromirrors is executed to modulate intensity of illumination light, and
the dichroic coating satisfies the following conditional expression (1):

$$|\cos^{-1}[\{(\sin\alpha\cdot\sin\beta\cdot\sin\theta)/n\}+\cos\beta\cdot\sqrt{\{1-(\sin^2\alpha)/n^2\}}]-\cos^{-1}[\{(\sin(\alpha-2\gamma)\cdot\sin\beta\cdot\sin\theta)/n\}+\cos\beta\cdot\sqrt{\{1-(\sin^2(\alpha-2\gamma))/n^2\}}]|\leq 3 \text{ deg} \quad (1),$$

where, $\alpha$ is an incident angle of the illumination light with respect to the image display surface of the reflective display element, $\beta$ is an angle formed by a surface normal of the dichroic coating and a normal of the image display surface of the reflective display element, $\gamma$ is a tilt angle when the micromirror of the reflective display element is in a projection state, n is a refractive index of a glass material of the color separating/combining prism, and $\theta$ is a rotation angle from an orthogonal state of the first plane and the second plane.

15. A projector comprising:
a light source;
an illumination optical system that concentrates light from the light source, and outputs an illumination light;
the optical system according to claim 13, that directs light from the illumination optical system toward a reflective display element; and
a projection optical system that magnifies and projects, on a screen surface, an image displayed on the reflective display element.

16. A projector comprising:
a light source;
an illumination optical system that concentrates light from the light source, and outputs an illumination light;
the optical system according to claim 14, that directs light from the illumination optical system toward a reflective display element; and
a projection optical system that magnifies and projects, on a screen surface, an image displayed on the reflective display element.

* * * * *